United States Patent [19]

Kamajima et al.

[11] Patent Number: 4,604,561
[45] Date of Patent: Aug. 5, 1986

[54] CONTROL APPARATUS FOR MULTI-JOINTED ARM MECHANISM

[75] Inventors: Kohji Kamajima, Ibaraki; Yoshiyuki Nakano, Hitachi; Masakatsu Fujie; Yuji Hosoda, both of Ibaraki; Taro Iwamoto, Mito; Kazuo Honma, Ibaraki, all of Japan

[73] Assignee: Hitachi, Ltd., Tokyo, Japan

[21] Appl. No.: 661,958

[22] Filed: Oct. 17, 1984

[30] Foreign Application Priority Data

Oct. 17, 1983 [JP] Japan ................. 58-192352

[51] Int. Cl.⁴ ........................................... G05B 19/10
[52] U.S. Cl. ................................. 318/567; 318/561; 364/131; 364/148
[58] Field of Search ............. 318/567, 568, 561, 574, 318/564; 364/131, 133, 148, 149, 150, 151, 513, 200, 900; 901/9, 15

[56] References Cited

U.S. PATENT DOCUMENTS

| | | | |
|---|---|---|---|
| 3,538,315 | 11/1970 | Reuteler | 318/574 |
| 3,665,168 | 5/1972 | Canfield | 364/151 X |
| 3,758,762 | 9/1973 | Littman | 318/561 X |
| 4,201,937 | 5/1980 | Irie | 901/9 X |
| 4,213,175 | 7/1980 | Kurihara | 364/150 X |
| 4,221,997 | 9/1980 | Flemming | 318/574 |
| 4,308,584 | 12/1981 | Arai | 364/513 |
| 4,407,017 | 9/1983 | Zhilikov | 364/149 X |
| 4,467,436 | 8/1984 | Chance | 364/513 |
| 4,490,660 | 12/1984 | Tsuchihashi | 318/568 X |

Primary Examiner—Bernard Roskoski
Assistant Examiner—Patrick C. Keane
Attorney, Agent, or Firm—Antonelli, Terry & Wands

[57] ABSTRACT

In a control apparatus for a multi-jointed arm mechanism having a plurality of arm elements in order to enhance the operating speed of each arm element, a true control error between a fore end of the arm element and a target position therefor, resulting from a movement of the arm element, and a predicted control error thereof have their difference evaluated, and the arm element is controlled so as to make the difference zero.

19 Claims, 5 Drawing Figures

CONTROL APPARATUS FOR MULTI-JOINTED ARM MECHANISM

BACKGROUND OF THE INVENTION

The present invention relates to a control apparatus for controlling a multi-jointed arm mechanism which is composed of a plurality of arm elements associated with one another and joints for coupling them.

A multi-jointed arm mechanism which consists of a plurality of arm elements associated with one another and joints for coupling them is, for example, the multi-articulated arm mechanism of a robot as disclosed in U.S. Pat. No. 4,221,997. In such multi-jointed arm mechanism, it is necessary to detect the movement magnitudes of the respective arm elements of this multi-jointed arm mechanism by means of a sensor and to adjust the outputs of the respective arm elements on the basis of the outputs of the sensor. Especially in the multi-jointed arm mechanism, the arm elements are associated with one another, so that the outputs of the respective arm elements need to be adjusted while holding cooperative relations with the other arm elements associated with one another. In order to realize such cooperative control, there has heretofore been adopted a concentrated type control apparatus comprising a single calculator which integrates and controls the plurality of arm elements. The concentrated type control apparatus applies the signals from the sensor to the single calculator, which computes on the basis of the input signals the request outputs of all of the plurality of arm elements constituting the multi-jointed arm mechanism and associated with one another, and it supplies the respective arm elements with the computed values as control signals and controls the respective arm elements so as to agree with the target values thereof. Thus, since the respective arm elements are operated and controlled on the basis of the control signals from the single calculator, problems stated below are involved. That is, in computing the control signals of the large number of arm elements collectively with the single calculator, a matrix operation on a large scale is required. A considerable period of time is needed for executing the matrix operation, so that the control apparatus and also the whole multi-jointed arm mechanism come to have unfavorable response rates. The degradations of the response rates form a hindrance to the high operating speed of the the multi-jointed arm mechanism.

SUMMARY OF THE INVENTION

The present invention has been made in view of the aforementioned drawbacks, and has for its object to provide a control apparatus which can enhance the operating speed of a multi-jointed arm mechanism having a plurality of arm elements associated with one another and joints for coupling them.

The present invention for accomplishing the object includes, in a multi-jointed arm mechanism having a plurality of arm elements which are respectively driven by actuators, means to detect information of a common control error of the multi-jointed arm mechanism relative to a target position thereof, and control means connected to the actuator of at least one of the arm elements and to compute an arm element movement magnitude for making zero a difference between the common control error information from the detection means produced by a movement of the arm element and predictive information of the common control error computed on the basis of movement information of the arm element and to deliver it to the corresponding actuator.

Other objects, advantages and features of the present invention will become apparent from embodiment to be described below.

DETAILED DESCRIPTION OF THE PREFERRED EMBODIMENTS

Now, embodiments of the present invention will be described with reference to the drawings.

Figure 1:
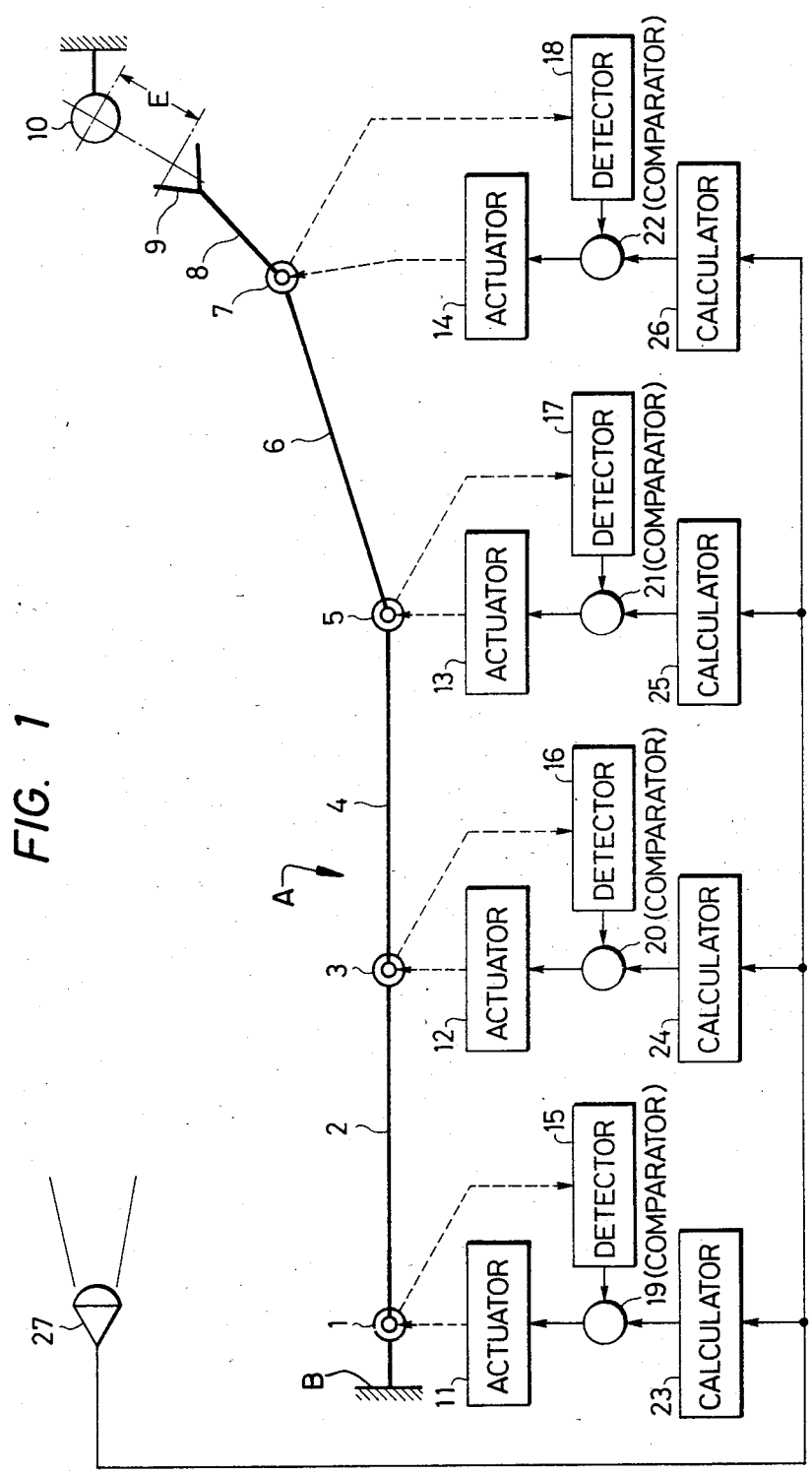
FIG. 1 is a diagram showing a multi-jointed arm mechanism which is equipped with an example of the control apparatus of the present invention.

FIG. 1 shows a multi-jointed arm mechanism which is equipped with an example of the control apparatus of the present invention. In this figure, the multi-jointed arm mechanism A is installed on, for example, a movable base B. This multi-jointed arm mechanism A is constructed of a first arm element 2 which is turnably mounted on the base B by a first joint 1, a second arm element 4 which is turnably mounted on the fore end of the first arm element 2 by a second joint 3, a third arm element 6 which is turnably mounted on the fore end of the second arm element 4 by a third joint 5, a fourth arm element 8 which is turnably mounted on the fore end of the third arm element 6 by a fourth joint 7, and a grip 9 which is provided at the fore end of the fourth arm element 8. An object which is grasped by the grip 9 is indicated by numeral 10. The arm elements 2, 4, 6 and 8 constituting the multi-jointed arm mechanism A are respectively driven by actuators 11–14 which are disposed on the shafts of the respective joints 1, 3, 5 and 7. These actuators 11–14 can be constructed of, for example, stepping motors. The shafts of the joints 1, 3, 5 and 7 are respectively furnished with detectors 15–18 which detect the movement magnitudes $\theta_1$–$\theta_4$ of the arm elements 2, 4, 6 and 8 coupled to the respective joints 1, 3, 5 and 7. The detection signals $\theta_1$–$74_4$ from the respective detectors 15–18 are negatively fed back to comparators 19–22 which constitute the drive control systems of the corresponding arm elements 2, 4, 6 and 8. These comparators 19–22 compare target movement magnitudes $\theta_1'$–$\theta_4'$ from calculators 23–26 included in the drive control systems, with the actual movement magnitudes $\theta_1$–$74_4$ from the detectors 15–18, and they deliver the errors $e_1$–$e_4$ between them to the actuators 11–14, respectively. The aforementioned calculators 23–26, which are respectively incorporated in the drive control systems of the arm elements 2, 4, 6 and 8, are all supplied with a signal concerning the positional deviation magnitude (common control error magnitude) E of the grip 9 relative to the object 10, the signal being delivered from an input device 27. Thus, they predictively compute the movement magnitudes of the respective arm elements 2, 4, 6 and 8 so as to successively deliver the target movement magnitudes $\theta_1'-\theta_4'$ which compensate for the common control error E. The input device 27 mentioned above can be constructed of a television camera or the like.

Figure 2:
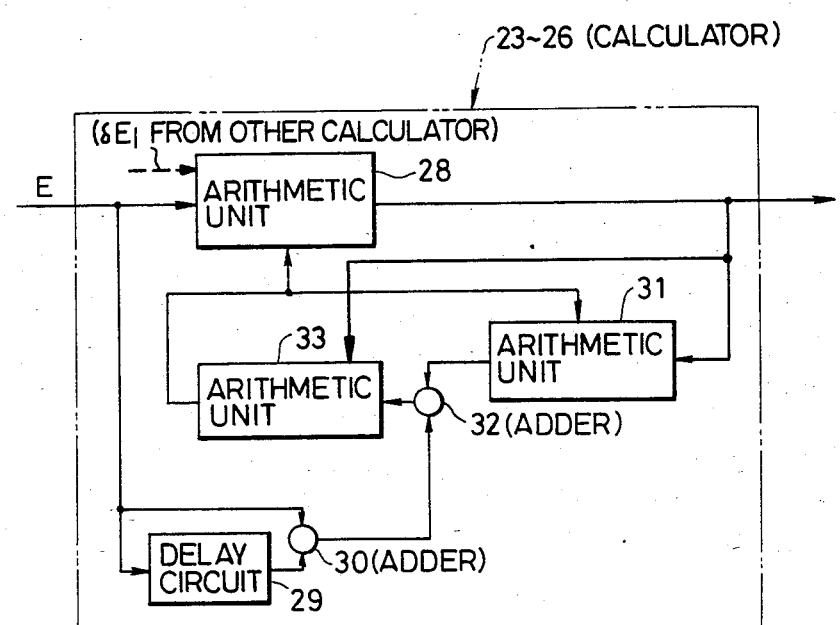
FIG. 2 is a diagram showing the arrangement of an example of a calculator which constitutes the control apparatus of the present invention shown in FIG. 1.
Figure 3:
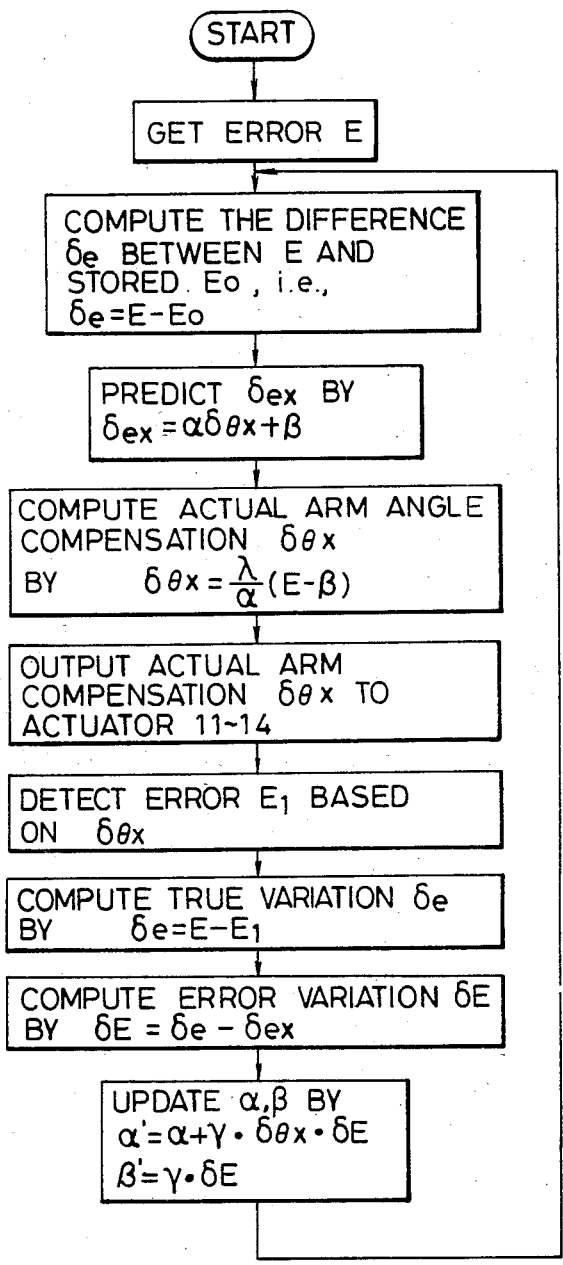
FIG. 3 is an operating flow chart of the calculator shown in FIG. 2.

An example of the arrangement of each of the calculators 23-26 incorporated in the drive control systems of the arm elements stated before will be described with reference to FIG. 2. Numeral 28 designates an arithmetic unit which computes the compensation value $\delta\theta_x$ of the corresponding one of the movement magnitudes $\theta_1-\theta_4$ of the respective arm elements 2, 4, 6 and 8. The arithmetic unit 28 for the arm compensation value computes the compensation value $\delta\theta_x$ of the corresponding one of the actual movement magnitudes $\theta_1-\theta_4$ of the respective arm elements 2, 4, 6 and 8 on the basis of the common control error or displacement magnitude E of the grip 9 relative to the object 10 as delivered from the input device 27. The compensation value $\delta\theta_x$ can be computed with the following equation (1):

$$\delta\theta_x = (\lambda/\alpha)(E-\beta) \quad \ldots (1)$$

where $\alpha, \beta$: coefficients, $\lambda$: proportion coefficient for compensation, which is a plus or positive constant smaller than 1. Numeral 29 designates a delay circuit. Numeral 30 designates an adder, which adds the last control error E and a control error $E_1$ obtained with the arm compensation value $\delta\theta_x$ and thus evaluates the true variation $\delta e$ between them. Numeral 31 indicates an arithmetic unit for a predictive variation, which computes the predictive variation $\delta e_x$ on the common control error E on the basis of the aforementioned compensation value $\delta\theta_x$. This predictive variation $\delta e_x$ can be computed with the following equation (2):

$$\delta e_x = \alpha \cdot \delta\theta_x + \beta \quad \ldots (2)$$

where $\alpha, \beta$: coefficients. Shown at numeral 32 is an adder, which evaluates an error variation $\delta E$ (= $\delta e - \delta e_x$) by the use of the true variation $\delta e$ and the predictive variation $\delta e_x$. Numeral 33 denotes an arithmetic unit for updating the coefficients, which computes the coefficients $\alpha$ and $\beta$ in the operating equation of the predictive-variation arithmetic unit 31, i.e., the foregoing equation (2) and the operating equation of the arm-compensation-value arithmetic unit 28, i.e., the foregoing equation (1) into updated coefficients $\alpha'$ and $\beta'$ indicated in the following equations (3) and (4), respectively, on the basis of the error variation $\delta E$, respectively, and which delivers the updated coefficients $\alpha'$ and $\beta'$ as updated values to the predictive-variation arithmetic unit 31 and the arm-compensation-value arithmetic unit 28:

$$\alpha' = \alpha + \gamma \cdot \delta\theta_x \cdot E \quad \ldots (3)$$

$$\beta' = \gamma \cdot \delta E \quad \ldots (4)$$

where $\delta$: plus or positive constant. Next, operations for controlling the multi-jointed arm mechanism by means of the above example of the control apparatus of the present invention will be described with reference to a flow chart in FIG. 3.

As illustrated in FIG. 1, it is now assumed that when the actuator 11, for example, has been operated to change the first arm element 2 by an angle $\delta\theta$, the grip 9 of the multi-jointed arm mechanism A involves a common control error E relative to the object 10 to be grasped. The common control error of the grip 9 relative to the object 10 before changing the first arm element 2 by the angle $\delta\theta$ as stated above, is denoted by $E_O$. The control error E of the grip 9 relative to the object 10, ascribable to the change of the first arm element 2 by the angle $\delta\theta$, is applied to the respective calculators 23-26 by the vision device 27. Since, in this case, only the first arm element 2 has been operated as described above, the control error E is used in only the calculator 23. The control error E applied to the calculator 23 is compared with the last control error $E_O$ in the adder 30, to find the difference $\delta e$ (= $E - E_O$). Meanwhile, the predictive-variation arithmetic unit 31 receives the arm compensation angle $\delta\theta_x$ of the first arm element 2 from the arm-compensation-angle arithmetic unit 28 to be described below and computes a predictive variation $\delta e_x$ on the basis of Equation (2) mentioned before. Upon receiving the control error E, the arm-compensation-angle arithmetic unit 28 computes an actual arm compensation angle $\delta\theta_x$ on the basis of Equation (1) mentioned before. The actual arm compensation angle $\delta\theta_x$ is delivered to the actuator 11. Thus, the first arm element 2 is moved. As a result, the grip 9 causes a control error $E_1$ relative to the object 10. The control error $E_1$ is detected by the vision device 27, and is applied to the adder 30 of the calculator 23. Thus, the adder 30 evaluates the true variation $\delta e$ between this control error $E_1$ and the last control error E. This true variation $\delta e$ is compared in the adder 32 with the predictive variation $\delta e_x$ delivered from the predictive-variation arithmetic unit 31, whereby an error variation $\delta E$ (= $\delta e - \delta e_x$) is computed. This error variation $\delta E$ is applied to the coefficient updating arithmetic unit 33. Thus, the coefficient updating arithmetic unit 33 computes the updated coefficients $\alpha'$ and $\delta'$ of the respective coefficients $\alpha$ and $\beta$ in Equations (1) and (2) on the basis of Equations (3) and (4) mentioned before, and it delivers the updated coefficients $\alpha'$ and $\delta'$ to the predictive-variation arithmetic unit 31 and the arm-compensation-angle arithmetic unit 28 so as to substitute them for the respective coefficients $\alpha$ and $\beta$ in the units 31 and 28. In this way, the predictive-variation arithmetic unit 31 and the arm-compensation-angle arithmetic unit 28 have gotten ready for the next control operations for positioning the grip 9 to the object 10.

Although, for convenience sake, the above operations have been explained for the single arm element, also the respective arm elements 4, 6 and 8 can be similarly controlled.

As thus far described, the control apparatus of the present invention consists in evaluating the predictive variation $\delta e_x$ of the control error of the grip 9 relative to the object 10 on the basis of the angular displacements of the respective arm elements, computing the true variation $\delta e$ obtained with the angular displacements, and updating the error variation on the basis of the variations $\delta e_x$ and $\delta e$. Thus, the respective arm elements 2, 4, 6 and 8 are cooperatively controlled. In other words, since the control is performed for each of the arm elements 2, 4, 6 and 8, it is possible to effect such control at a higher speed than in an apparatus having a higher-ranking computer which integratingly controls the respective arm elements 2, 4, 6 and 8.

Figure 4:
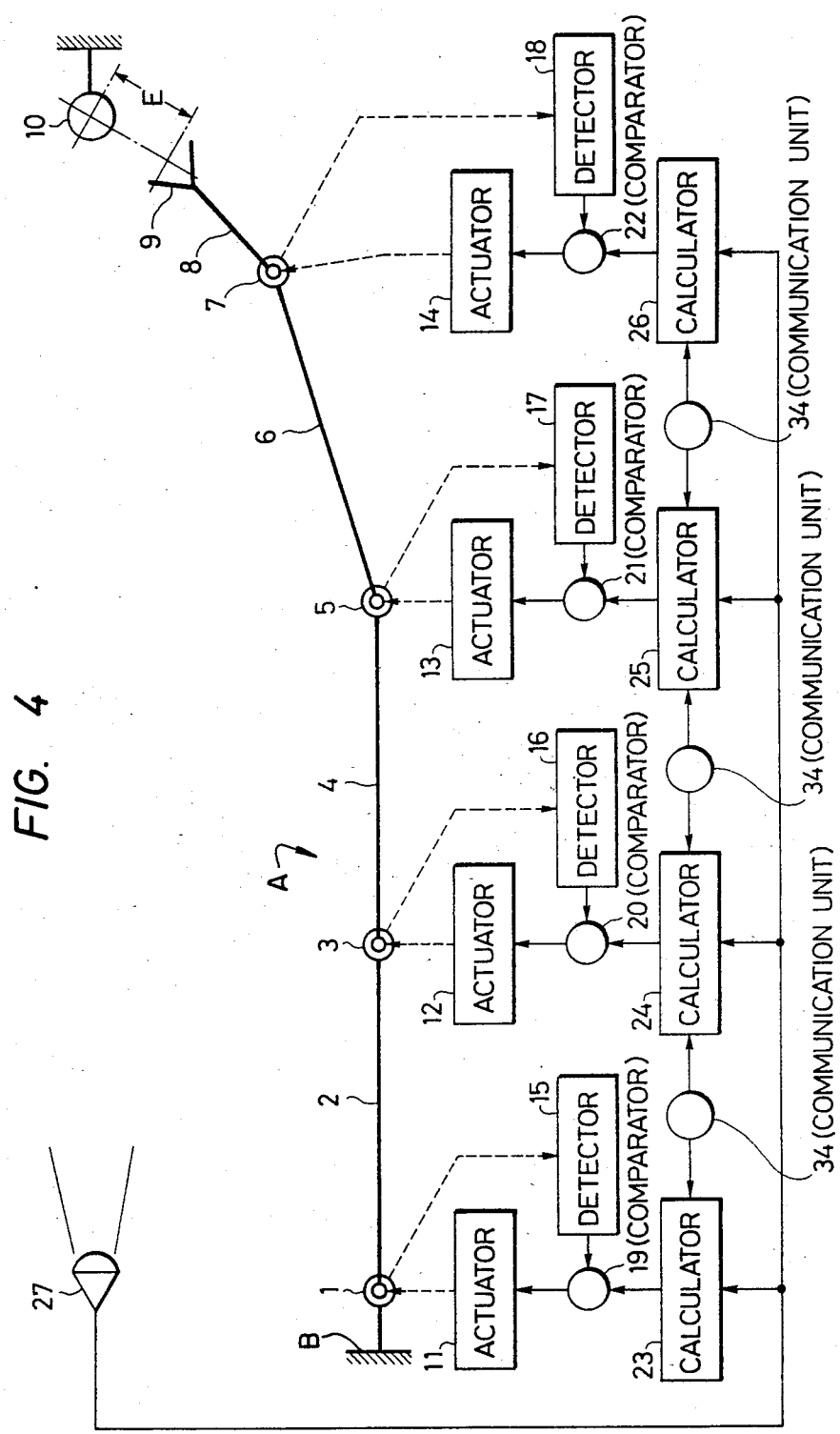
FIG. 4 is a diagram showing a multi-jointed arm mechanism which is equipped with another example of the control apparatus of the present invention.

FIG. 4 shows another embodiment of the control apparatus of the present invention. This embodiment consists in that, in order to increase or decrease control errors attributed to the operations between the respective arm elements 2, 4, 6 and 8, the calculators 23–26 corresponding to these arm elements 2, 4, 6 and 8 are connected by communication units 34. In this case, an error variation $\delta E_1$ caused when another arm element has been changed by $\delta\theta_{x1}$ is applied to the arm-compensation-angle arithmetic unit 28 as shown in dashed line in FIG. 2. For this reason, the foregoing equation (1) in the arm-compensation-angle arithmetic unit 28 needs to be altered to the following equation (5):

$$\delta\theta_x = (\lambda/\alpha)(E - \beta - \delta E_1) \tag{5}$$

While, in the embodiments described above, the coefficients of Equation (2) for the predictive computation are updated on the basis of data or are learned, they may of course be computed beforehand and kept stored.

Figure 5:
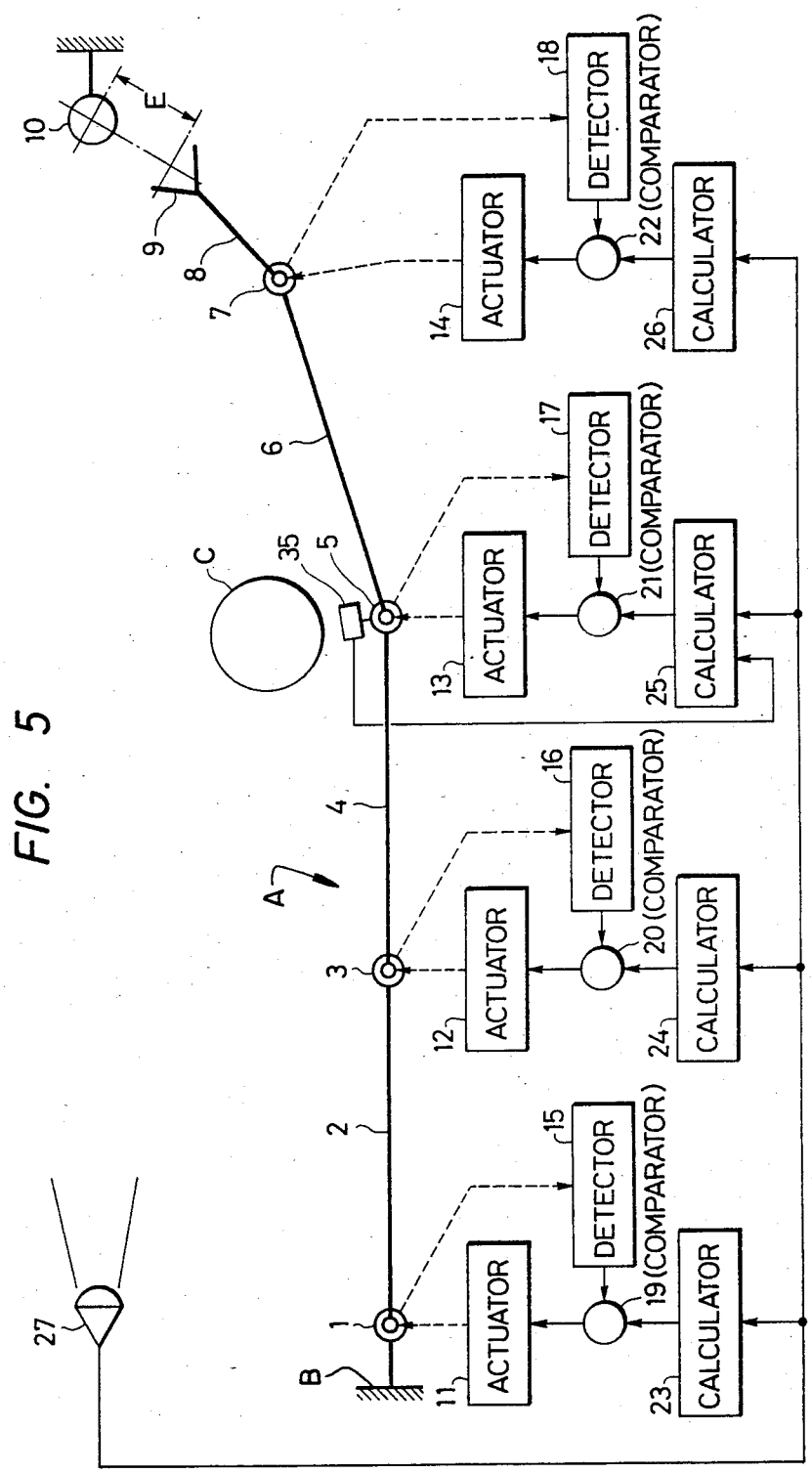
FIG. 5 is a diagram showing a multi-jointed arm mechanism which is equipped with still another example of the control apparatus of the present invention.

In the foregoing embodiments, the control error of the grip 9 of the multi-jointed arm mechanism A relative to the object 10 is controlled by the use of the positioning error of the fore end of the grip 9. In ordinary cases, the operating region of the multi-jointed arm mechanism A can be secured to a sufficient extent, so that the control apparatus of the present invention is applicable. However, in a case where the operating region is not sufficiently obtained due to the existence of an obstacle or the like, this situation can be coped with in such a way that the control apparatus of the present invention described above is supplied with information on the approach to the obstacle, of the arm element which is located midway of the multi-jointed arm mechanism A. In this case, as illustrated in FIG. 5, the intermediate arm element is provided with a sensor 35 for sensing the obstacle C, and a sensed signal S from the sensor 35 is applied to the calculator 25, whereby a movement for preventing the intermediate arm element from moving toward the obstacle B can be compensated for. A calculator in this case can be constructed by treating the sensed signal just as the control error of the grip 9 relative to the object 10 is treated in the calculator shown in FIG. 2. Therefore, it shall not be described in detail.

We claim:

1. A control apparatus for a multi-jointed arm mechanism having a plurality of arm elements which are respectively driven by actuator means, the control apparatus comprising input means for detecting information indicative of a displacement of the multi-jointed arm mechanism relative to a target position therefor and for providing a common output indicative of the displacement as a commmon control error signal, arithmetic means coupled to the actuator means of at least one of the arm elements for calculating a target movement magnitude of the arm element in response to the common control error signal from the input means and predictive information of the displacement calculated on the basis of movement information of the arm element and for providing an output target movement magnitude signal, means for detecting an actual movement magnitude of the arm element and providing an output signal indicative thereof, and comparison means for comparing the actual movement magnitude signal from the detecting means and the target movement magnitude signal from the arithmetic means and for providing an output signal indicative of the deviation therebetween to the associated actuator means for the arm element.

2. A control apparatus according to claim 1, wherein the actuator means is responsive to the deviation signal from the comparison means for controlling the positioning of the arm element to make the deviation between the actual movement magnitude signal and the target movement magnitude signal to be zero.

3. A control apparatus according to claim 2, wherein the input means includes means for detecting a positioning error between a fore end of the multi-jointed arm mechanism and a target position therefor as the common control error signal and for supplying the common control error signal to the arithmetic means.

4. A control apparatus according to claim 3, wherein the input means includes vision means for viewing the fore end of the multi-jointed arm mechanism and the target position therefor to detect the displacement.

5. A control apparatus according to claim 3, wherein the input means further includes sensor means for sensing an obstacle and for supplying a signal indicative of the displacement of the multi-jointed arm mechanism from the obstacle to the arithmetic means.

6. A control apparatus according to claim 5, wherein the sensor means is disposed on an arm element of the multi-jointed arm mechanism positioned between a base end and the fore end of the multi-jointed arm mechanism.

7. A control apparatus according to claim 5, wherein the arithmetic means calculates a target movement magnitude signal on the basis of the present common control error signal and a previous common control error signal and movement thereof.

8. A control apparatus according to claim 7, wherein the arithmetic means includes means for storing the previous common control error signal.

9. A control apparatus according to claim 7, wherein the arithmetic means includes first calculating means for calculating the target movement magnitude signal $\delta\theta_x$ in accordance with the equation $\delta\theta_x = (\pi/\alpha)(E - \beta)$, where E is the present common control error signal, $\alpha$ and $\beta$ are coefficients, and $\nu$ is a proportion coefficient for compensation which is a positive constant smaller than 1, first comparing means for comparing the present common control error signal E with the previous common control error signal $E_0$ and providing a true error deviation output signal $\delta e$, second calculating means for calculating a predictive error signal $\delta e_x$ in response to the calculated target movement magnitude signal $\delta\theta_x$ in accordance with the equation $\delta e_x = \alpha \cdot \delta\theta_x + \beta$, second comparing means for comparing the predictive error signal $\delta e_x$ with the true error deviation signal $\delta_e$ and providing an error variation signal $\delta E$ as an output thereof, and third calculating means for calculating updated coefficient values $\alpha'$ and $\beta'$ for the coefficient value $\alpha$ and $\beta$ utilized by the first and second calculating means in accordance with the equations $\alpha' = \alpha + \gamma \cdot \delta\theta_x \cdot \delta E$ and $\delta' = \gamma \cdot \delta E$, where $\gamma$ is a positive constant, the third calculating means supplying the updated coefficient values to the first and second calculating means.

10. A control apparatus according to claim 9, wherein a plurality of arithmetic means are provided, a respective arithmetic means being associated with a respective actuator means of an arm element, and further comprising communication means interconnecting the respective arithmetic means for supplying the error variation signal δE generated by one of the arithmetic means to another of the arithmetic means.

11. A control apparatus according to claim 3, wherein the arithmetic means calculates a target movement magnitude signal on the basis of the present common control error signal and a previous control error signal and movement magnitudes thereof.

12. A control apparatus according to claim 11, wherein the arithmetic means includes means for storing the previous common control error signal.

13. A control apparatus according to claim 12, wherein a plurality of arithmetic means are provided, a respective arithmetic means being associated with a respective actuator means of an arm element, and further comprising communication means interconnecting the respective arithmetic means for supplying a signal generated by one of the arithmetic means to another of the arithmetic means.

14. A control apparatus according to claim 11, wherein the arithmetic means includes a first calculating means for calculating the target movement magnitude signal $\delta\theta_x$ in accordance with the equation $\delta\theta_x = (\lambda/\alpha)(E-\beta)$, where E is the present common control error signal, $\alpha$ and $\beta$ are coefficients, and $\lambda$ is a proportion coefficient for compensation which is a positive constant smaller than 1, first comparing means for comparing the present common control error signal E with the previous common control error signal $E_0$ and providing a true error deviation output signal $\delta e$, second calculating means for calculating a predictive error signal $\delta e_x$ in response to the calculated target movement magnitude signal $\delta\theta_x$ in accordance with the equation $\delta e_x = \alpha \cdot \delta\theta_x + \beta$, second comparing means for comparing the predictive error signal $\delta e_x$ with the true error deviation signal $\delta_e$ and providing an error variation signal $\delta E$ as an output thereof, and third calculating means for calculating updated coefficient values $\alpha'$ and $\beta'$ for the coefficient value $\alpha$ and $\beta$ utilized by the first and second calculating means in accordance with the equations $\alpha' = \alpha + \gamma \cdot \delta\theta_x \delta E$ and $\beta' = \gamma \cdot \delta E$, where $\gamma$ is a positive constant, the third calculating means supplying the updated coefficient values to the first and second calculating means.

15. A control apparatus according to claim 14, wherein a plurality of arithmetic means are provided, a respective arithmetic means being associated with a respective actuator means of an arm element, and further comprising communication means interconnecting the respective arithmetic means for supplying the error variation signal δE generated by one of the arithmetic means to another of the arithmetic means.

16. A control apparatus according to claim 2, wherein a plurality of arithmetic means are provided, a respective arithmetic means being associated with a respective actuator means of an arm element.

17. A control apparatus according to claim 1, wherein the arithmetic means includes a first calculating means for calculating the target movement magnitude signal $\delta\theta_x$ in accordance with the equation $\delta\theta_x = (\lambda/\alpha)(E-\beta)$, where E is the present common control error signal, $\alpha$ and $\beta$ are coefficients, and $\lambda$ is a proportion coefficient for compensation which is a positive constant smaller than 1, first comparing means for comparing the present common control error signal E with the previous common control error signal $E_0$ and providing a true error deviation output signal $\delta e$, second calculating means for calculating a predictive error signal $\delta e_x$ in response to the calculated target movement magnitude signal $\delta\theta_x$ in accordance with the equation $\delta e_x = \alpha \cdot \delta\theta_x + \beta$, second comparing means for comparing the predictive error signal $\delta e_x$ with the true error deviation signal $\delta_e$ and providing an error variation signal $\delta E$ as an output thereof, and third calculating means for calculating updated coefficient values $\alpha'$ and $\beta'$ for the coefficient value $\alpha$ and $\beta$ utilized by the first and second calculating means in accordance with the equations $\alpha' = \alpha + \gamma \cdot \delta\theta_x \cdot \delta E$ and $\beta' = \gamma \cdot \delta E$, where $\gamma$ is a positive constant, the third calculating means supplying the updated coefficient values to the first and second calculating means.

18. A control apparatus according to claim 17, wherein a plurality of arithmetic means are provided, a respective arithmetic means being associated with a respective actuator means of an arm element, and further comprising communication means interconnecting the respective arithmetic means for supplying the error variation signal δE generated by one of the arithmetic means to another of the arithmetic means.

19. A control apparatus according to claim 1, wherein a plurality of arithmetic means are provided, a respective arithmetic means being associated with a respective actuator means of an arm element.

* * * * *